Aug. 24, 1965     B. L. PONTONI ETAL     3,201,872

DIAMETER AND ROUNDNESS GAGING INSTRUMENT

Filed Aug. 3, 1962

INVENTORS
BERTON L. PONTONI
MALCOLM PAUL HAYDEN
BY

*Albert L. Jeffers*

ATTORNEY

United States Patent Office 3,201,872
Patented Aug. 24, 1965

3,201,872
DIAMETER AND ROUNDNESS GAGING
INSTRUMENT
Berton L. Pontoni, 3416 River Forest Drive, and Malcolm Paul Hayden, 4015 Wawonaissa Trail, both of Fort Wayne, Ind.
Filed Aug. 3, 1962, Ser. No. 214,740
5 Claims. (Cl. 33—147)

This invention relates to an instrument for testing the diameter and the roundness of cylindrical material, and more particularly to a gaging instrument which is used to determine the diameter and roundness of copper and aluminum wire.

It is a general object of the present invention to provide an instrument for gaging the roundness of a wire by rotating the wire in progressive steps between a gage indicator spindle and a bearing surface so that the wire may be measured at different angels to determine whether or not the roundness is within tolerance of a prescribed specification.

A primary object of the invention is to provide a gaging instrument wherein the bearing surface which supports the work material can be adjusted with respect to the spindle of the gaging means so that it can be positioned in a parallel relationship thereto.

An important object of the invention is to provide an adjustable support for a gaging instrument having a bearing surface which can be moved transversely with respect to the gaging means whereby the bearing surface can be changed beneath the spindle of the gaging means to provide a new bearing surface when the old bearing surface has become excessively worn.

A further object of the invention is to provide a gaging instrument having a bearing surface which can be adjusted to be in parallel relationship with respect to a spindle of the gaging means and can be replaced if the bearing surfaces become worn from use.

A still further object of the invention is to provide a gaging instrument to determine the out of roundness of cylindrical material by means of rotating the cylindrical material between a gaging spindle and a bearing surface.

Other objects and features will in part be obvious, and in part be pointed out as the description of the invention proceeds, as shown in the accompanying drawing, wherein there is described a preferred embodiment of this inventive concept.

Figure 3:
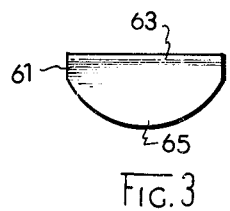
FIGURE 3 is a detailed view illustrating the adjustable anvil having a bearing surface.
Figure 1:
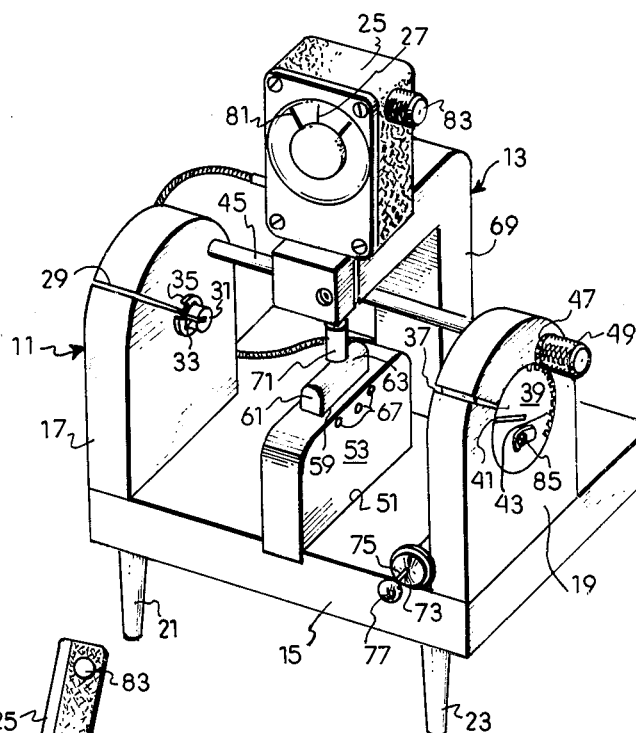
FIGURE 1 is a perspective view illustrating the preferred embodiment of the gaging instrument.

Referring to the drawings in detail, the reference numeral 11 designates the gaging instrument having a frame or fixture 13 provided with a base portion 15 which supports an end member 17 and an end member 19 disposed in substantially parallel relationship. The base 15 is provided with legs 21 and 23 disposed along one side so that the frame will be tilted which will facilitate the insertion of the cylindrical material into the gaging instrument and will dispose the gage 25 at an angle so that the operator can more readily observe the indicator needle 27.

The end member 17 is provided with a transverse slot 29 and carries a rotatable member or hub 31 provided with a transverse slot 33 which corresponds with the slot 29. The rotatable member or hub 31 is retained on the end member by a lock washer 35. The end member 19 is provided with a transverse slot 37 which is substantially parallel to the slot 29. A rotatable disk or member 39 is disposed concentrically within the end member 19 and is provided with a transverse slot 41 corresponding with the slot 37. The disk 39 is provided with a number of gear teeth 43. A rotatable shaft 45 is carried by the end members 17 and 19 and is provided with a gear 47 having teeth which mesh with the teeth 43 of the disk 39. A disk (not shown) substantially similar to the disk 39 is carried by the hub 31 and is driven by a gear (not shown) mounted on the shaft 45. The disk and gear drive are not shown because they are identical to the disk 39 and gear 47 shown on the end member 19. A knob 49 having a knurled surface is mounted on the end of the shaft 45 so that it may be manually rotated.

Figure 2:
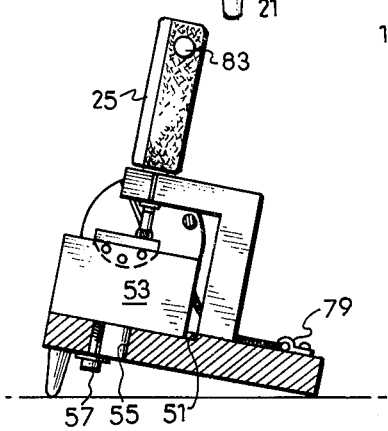
FIGURE 2 is a cross-sectional view of the gaging instrument illustrated in FIGURE 1 showing the details of the adjustable support.

The base 15 is provided with a recess 51 for receiving an adjustable support 53. An elongated slot 55 (FIGURE 2) extends through the base 15 within the recess 51, and a lock bolt 57 is used to lock the adjustable support in the desired position. The adjustable support is provided with a recess 59 for receiving an anvil 61 having a bearing surface 63. As illustrated in FIGURE 3, the anvil 61 is provided with a half moon or angular portion 65 which is received within the recess 59 and secured therein by set screws 67. An L-shaped support 69 is carried by the base 15 and has a conventional gage or indicator 25 mounted thereon. The gage 25 is provided with a spindle 71 adapted to actuate the needle 27. The spindle 71 is disposed substantially perpendicular to the bearing surface 63 and has a flat contact point at its end. An actuator 73 having a cable 75 is adapted to raise and lower the spindle 71 by pressing a button 77. The numeral 79 designates a clamp for holding the cable to the base 15. Usually the gage 25 is provided with tolerance indicators 81 which serve to indicate to the operator that if the needle 27 passes these two marks, the cylindrical material is not sufficiently in round to a specific specification. The numeral 83 designates a knob for adjusting the gage 25.

OPERATION

The adjustable support 53 is positioned in the recess 51 so that a portion of the bearing surface 63 is disposed under the flat contact point of the vertical spindle 71. The support then is secured therein by the adjustable bolt 57. The anvil 61 is then set so that its horizontal axis is at a right angle to the flat contact point of the spindle 71 and is secured in this position by the set screws 67. The spindle 71 is then raised by pressing the button 77 which actuates the cable 75. The slot 41 in the disk 39 is then rotated by turning the knob 49 until it is in alignment with the slot 37. The slot 33 in the rotatable member 31 will also be aligned with the slot 29, and a master gage wire (not shown) is then inserted between the flat contact point of the spindle 71 and the bearing surface 63. The spindle is then released or lowered by the actuator 73 so that it contacts the master gage wire. At this point, the gage may be preset as to the diameter of the wire. Also, the gage indicators 81 may be set for a predetermined tolerance allowed by the specifications. The button 77 is then actuated to raise the spindle 71, and the master wire is then removed. The gaging instrument is now ready for testing cylindrical material, such as copper wire or aluminum wire, to determine its diameter and to indicate whether or not the material is out of round. This is accomplished by taking a sample piece of wire from the production run approximately 8 inches long and placing it in the slots 29 and 37 and beneath the spindle 71. The test wire is usually secured to the disk 39 by a fastener 85. The spindle 71 is then released or lowered by the actuator 73, and the diameter of the wire can then be measured by the gage 25. The spindle 71 is again raised by pressing the button 77, and the wire is rotated approximately 30° by actuating the knob 49 which in turn rotates the disk 39. The spindle 71 is again lowered by the actuator 73, and another reading is obtained on the gage 25. This step by step process is done through approximately 90° wherein it can be readily determined by taking readings on the gage 25 whether or not the wire is out of round.

After the gaging instrument 11 has been used, the bearing surface 63 sometimes becomes worn, which would give improper readings on the gage 25. This discrepancy in the gage reading can be corrected by moving the adjustable support 53 a sufficient distance in the recess 51 so that the flat contact point of the spindle will have a new portion of the bearing surface 63 disposed there beneath.

Since many embodiments may be made of this invention and as many modifications may be made in the gage instrument as shown and described, it is to be understood that all matter herein is to be interpreted merely as illustrative and not in a limited manner.

We claim:

1. An instrument for testing and measuring the roundness of cylindrical material comprising in combination:
    (a) a fixture having spaced end members,
    (b) each end member provided with a substantially parallel slot,
    (c) rotatable means including a slot corresponding with the slot in the end members, said end members adapted to support the rotatable means,
    (d) a bearing member disposed on the fixture between the end members,
    (e) gaging means carried by the fixture and responsive to the diameter of the cylindrical material along a measuring axis intersecting the bearing member, and
    (f) manually actuated adjustment means to rotate the cylindrical material between the gaging means and bearing member.

2. An instrument for testing the diameter and the roundness of cylindrical material comprising in combination:
    (a) a fixture having spaced end members,
    (b) means for elevating one side of the fixture,
    (c) each end member provided with a substantially parallel slot for receiving the cylindrical material,
    (d) a rotatable member disposed substantially in the center of each end member,
    (e) said rotatable member provided with a slot corresponding with the slot in the end member for receiving the cylindrical material,
    (f) a support having a bearing surface carried by the fixture and disposed between the end members,
    (g) gaging means carried by the fixture and responsive to the diameter of the cylindrical material along a measuring axis intersecting the bearing surface, and
    (h) manually actuated adjustment means connected to the rotatable member to rotate the cylindrical material between the gaging means and the bearing surface.

3. An instrument for testing the diameter and the roundness of cylindrical material comprising in combination:
    (a) a frame having a base portion and end members disposed substantially perpendicular to base portion,
    (b) said end members provided with rotatable means,
    (c) said end members and rotatable means having a transverse slot for receiving the cylindrical material,
    (d) means for securing the cylindrical material to the rotatable means,
    (e) gaging means carried by the frame, and
    (f) adjustment means for operating the rotatable means a predeterminate angle so that the gaging means will indicate whether or not the cylindrical material is out of round.

4. An instrument for testing the diameter and the roundness of cylindrical material comprising in combination:
    (a) a frame having end members disposed in substantially parallel relationship,
    (b) each end member having concentrically disposed rotatable disks,
    (c) said end member and disks having a corresponding slot for receiving the cylindrical material,
    (d) gaging means carried by the frame and disposed intermediate the end members,
    (e) an adjustable support provided with an anvil having a bearing surface,
    (f) said gaging means including a spindle positioned in vertical alignment with a portion of said bearing surface,
    (g) means for raising and lowering the spindle so that the cylindrical material can be positioned between the spindle and bearing surface, and
    (h) means for actuating the rotatable disks so that the cylindrical material can be rotated in progressive steps between the spindle and bearing surface whereby the gaging means will indicate whether or not the cylindrical material is within tolerance with respect to roundness.

5. An instrument for testing the diameter and the roundness of cylindrical material comprising in combination:
    (a) a frame having end members provided with transverse slots disposed in substantially parallel relationship,
    (b) one end member having a rotatable disk disposed concentrically therewith, said disk having a transverse slot corresponding to the slot in the end member,
    (c) said disk having gear teeth disposed on its periphery,
    (d) the other end member having a rotatable member disposed concentrically therewith, said rotatable member having a transverse slot corresponding to the slot in the end member,
    (e) a rotatable shaft carried by the end members, said shaft provided with a gear having teeth engaging the gear teeth on the disk, and knob means at the end of the shaft for rotating said shaft,
    (f) gaging means carried by the frame and disposed intermediate the end members,
    (g) an adjustable support provided with a bearing surface,
    (h) said gaging means including a spindle positioned in vertical alignment with a portion of said bearing surface, and
    (i) means for raising and lowering the spindle so that the cylindrical material can be positioned between the spindle and bearing surface whereby the cylindrical material can be rotated therebetween and a reading of the gaging means will indicate whether or not the cylindrical material is out of round.

References Cited by the Examiner

UNITED STATES PATENTS

| | | | |
|---|---|---|---|
| 1,346,572 | 7/20 | Walter | 33—147 |
| 1,932,682 | 10/33 | Beckley | 33—147 |
| 2,051,636 | 8/36 | Gastrich | 33—147 |
| 2,057,970 | 10/36 | Pelphrey | 33—179.5 |
| 2,664,641 | 1/54 | Parnet | 33—174 |
| 2,728,991 | 1/56 | Rinker | 33—147 |

FOREIGN PATENTS

685 A.D. 1889 Great Britain.

ISAAC LISANN, *Primary Examiner.*